(12) United States Patent
McLaughlin et al.

(10) Patent No.: US 10,995,626 B2
(45) Date of Patent: May 4, 2021

(54) BOAS AND METHODS OF MAKING A BOAS HAVING FATIGUE RESISTANT COOLING INLETS

(71) Applicant: UNITED TECHNOLOGIES CORPORATION, Farmington, CT (US)

(72) Inventors: Brian C. McLaughlin, Kennebunk, ME (US); Terence P. Tyler, East Waterboro, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 110 days.

(21) Appl. No.: 16/355,003

(22) Filed: Mar. 15, 2019

(65) Prior Publication Data

US 2020/0291806 A1 Sep. 17, 2020

(51) Int. Cl.
*F01D 11/08* (2006.01)
*F01D 25/24* (2006.01)

(52) U.S. Cl.
CPC .............. *F01D 11/08* (2013.01); *F01D 25/24* (2013.01); *F05D 2240/55* (2013.01); *F05D 2260/30* (2013.01); *F05D 2260/941* (2013.01); *F05D 2300/6033* (2013.01)

(58) Field of Classification Search
None
See application file for complete search history.

(56) References Cited

U.S. PATENT DOCUMENTS

| | | | | |
|---|---|---|---|---|
| 3,844,343 A | * | 10/1974 | Burggraf | F01D 11/08 165/109.1 |
| 5,165,847 A | * | 11/1992 | Proctor | F01D 11/08 415/115 |
| 5,584,651 A | * | 12/1996 | Pietraszkiewicz | F01D 11/08 415/115 |
| 6,139,257 A | * | 10/2000 | Proctor | F01D 9/04 415/115 |
| 6,666,645 B1 | * | 12/2003 | Arilla | F01D 11/24 415/116 |
| 8,123,473 B2 | * | 2/2012 | Shapiro | F01D 25/14 415/173.1 |
| 10,100,659 B2 | * | 10/2018 | Lamusga | F01D 11/08 |
| 2011/0044804 A1 | | 2/2011 | Dipaola et al. | |
| 2013/0323032 A1 | | 12/2013 | Lutjen et al. | |
| 2014/0083101 A1 | | 3/2014 | Xu et al. | |
| 2017/0211415 A1 | | 7/2017 | Swift et al. | |
| 2019/0218925 A1 | * | 7/2019 | Garay | F01D 11/08 |

FOREIGN PATENT DOCUMENTS

| | | |
|---|---|---|
| DE | 102016124432 | 6/2017 |
| EP | 3199756 | 8/2017 |
| JP | H11190204 | 7/1999 |

OTHER PUBLICATIONS

European Patent Office, European Search Report dated Jun. 24, 2020 in Application No. 20160710.8.

* cited by examiner

*Primary Examiner* — Michael Lebentritt
*Assistant Examiner* — Jason G Davis
(74) *Attorney, Agent, or Firm* — Snell & Wilmer L.L.P.

(57) ABSTRACT

A blade outer air seal segment may comprise a radially outward surface and a radially inward surface oriented away from the radially outward surface. A cooling channel may be located between the radially outward surface and the radially inward surface. An inlet orifice may be fluidly coupled to the cooling channel. A stress-relief orifice may be between the inlet orifice and the cooling channel.

13 Claims, 6 Drawing Sheets

BOAS AND METHODS OF MAKING A BOAS HAVING FATIGUE RESISTANT COOLING INLETS

FIELD

The present disclosure relates to gas turbine engines and, more specifically, to a blade outer air seal (BOAS) having fatigue resistant cooling inlets and methods of forming the same.

BACKGROUND

A gas turbine engine generally includes a fan section, a compressor section, a combustor section, and a turbine section. The fan section drives air along a bypass flow path and a core flow path. In general, during operation, air is pressurized in the compressor section and then mixed with fuel and ignited in the combustor section to generate combustion gases. The combustion gases flow through the turbine section, which extracts energy from the combustion gases to power the compressor section and generate thrust.

The blade assemblies of the turbine section generally include a BOAS to reduce flow leakage over the blade tips. The BOAS is subjected to extremely hot combustion gases. To cool the BOAS, cooling air from a secondary air flow system may be provided to internal cooling channels formed within the body of the BOAS. The cooling air may enter the internal cooling channels through inlet holes formed through the BOAS. The inlet holes tend to experience increased fatigue due to the tensile stresses resulting from the temperature difference between the flow-path side of the BOAS and the cooled side of the BOAS (i.e., the side proximate the combustion gases and the side proximate the cooling flow).

SUMMARY

A blade outer air seal segment is disclosed herein. In accordance with various embodiments, the blade outer air seal segment may comprise a radially outward surface and a radially inward surface oriented away from the radially outward surface. A cooling channel may be located between the radially outward surface and the radially inward surface. An inlet orifice may be fluidly coupled to the cooling channel. A stress-relief orifice may be between the inlet orifice and the cooling channel.

In various embodiments, the cooling channel may be defined, at least partially, by a distal channel surface and a proximal channel surface. The stress-relief orifice may be defined by an orifice wall and an orifice surface. The orifice wall may extend from the distal channel surface and the orifice surface.

In various embodiments, the inlet orifice may be formed through a raised portion of the blade outer air seal segment. In various embodiments, a radial height of the raised portion of the blade outer air seal segment may be greater than a radial height of the blade outer air seal segment at the radially outward surface. The radial height of the raised portion may be measured between a surface of the raised portion and the radially inward surface of the blade outer air seal segment. The radial height at the radially outward surface may be measured between the radially outward surface and the radially inward surface of the blade outer air seal segment.

In various embodiments, a radial height of the stress-relief orifice may be between 10% and 200% of a radial height of the cooling channel. In various embodiments, the stress-relief orifice may be concentric to the inlet orifice. In various embodiments, a diameter of the stress-relief orifice may be at least 10% greater than a diameter of the inlet orifice.

A turbine section of a gas turbine engine is also disclosed herein. In accordance with various embodiments, the turbine section may comprise a blade configured to rotate about an axis and a blade outer air seal segment radially outward of the blade. The blade outer air seal segment may comprise an internal cooling channel, an inlet orifice fluidly coupled to the internal cooling channel, and a stress-relief orifice between the inlet orifice and the internal cooling channel.

In various embodiments, the internal cooling channel may be defined, at least partially, by a distal channel surface and a proximal channel surface. The stress-relief orifice may be defined by an orifice wall and an orifice surface. The orifice wall may extend from the distal channel surface and the orifice surface.

In various embodiments, the inlet orifice may be formed through a raised portion of the blade outer air seal segment. In various embodiments, a radial height of the raised portion of the blade outer air seal segment may be greater than a radial height of a radially outward surface of the blade outer air seal segment. The radial height of the raised portion may be measured between a surface of the raised portion and a radially inward surface of the blade outer air seal segment. The radial height at the radially outward surface may be measured between the radially outward surface and the radially inward surface.

In various embodiments, the blade outer air seal segment may comprise a circumferential wall. A radial height of the circumferential wall may be greater than the radial height of the raised portion of the blade outer air seal segment.

In various embodiments, a radial height of the stress-relief orifice may be between 10% and 200% of a radial height of the internal cooling channel. In various embodiments, the stress-relief orifice may be concentric to the inlet orifice. In various embodiments, a diameter of the stress-relief orifice may be at least 10% greater than a diameter of the inlet orifice.

A method of forming a blade outer air seal segment is also disclosed herein. In accordance with various embodiments, the method may comprise depositing a blade outer air seal material around a core and forming an inlet orifice through the blade outer air seal material. The core may be configured to form a cooling channel in the blade outer air seal segment. The core may comprise a boss. A thickness of the core at the boss may be greater than a thickness of a channel portion of the core.

In various embodiments, forming the inlet orifice may comprise using electrical discharge machining to form the inlet orifice. In various embodiments, a diameter of the stress-relief orifice may be at least 10% greater than a diameter of the inlet orifice.

In various embodiments, the method may further comprise removing the core from the blade outer air seal material. In various embodiments, a location of the boss may correspond to a raised portion of the blade outer air seal segment.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact.

Cross hatching lines and surface shading may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion. As used herein, "distal" refers to a direction or component radially outward, or generally, away from the engine central longitudinal axis. As used herein, "proximal" refers to a direction or component radially inward, or generally, towards the engine central longitudinal axis.

A first component that is "radially outward" of a second component means that the first component is positioned at a greater distance away from a common axis (e.g., the engine central longitudinal axis) than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component.

Figure 1:
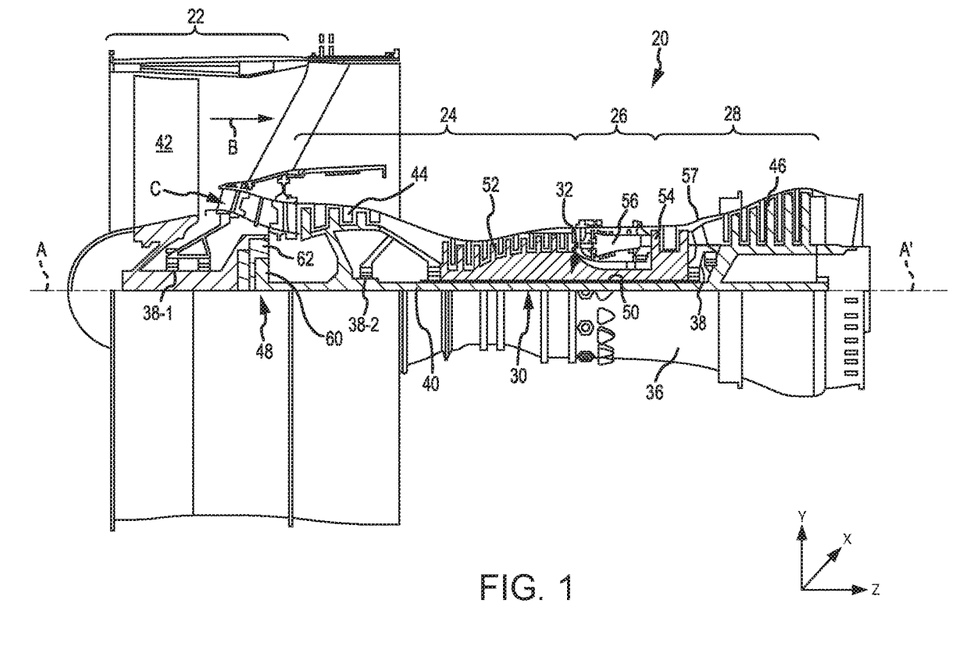
FIG. 1 illustrates a cross-sectional view of an exemplary gas turbine engine, in accordance with various embodiments.

With reference to FIG. 1, an exemplary gas turbine engine 20 is provided, in accordance with various embodiments. Gas turbine engine 20 may be a two-spool turbofan that generally incorporates a fan section 22, a compressor section 24, a combustor section 26, and a turbine section 28. In operation, fan section 22 drives fluid (e.g., air) along a bypass flow-path B, while compressor section 24 drives fluid along a core flow-path C for compression and communication into combustor section 26 and then expansion through turbine section 28. Although gas turbine engine 20 is depicted as a turbofan gas turbine engine herein, it should be understood that the concepts described herein are not limited to use with turbofans as the teachings may be applied to other types of turbine engines, including engines having more or less than two spools.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. It should be understood that various bearing systems 38 at various locations may alternatively or additionally be provided, including for example, bearing system 38, bearing system 38-1, and bearing system 38-2. Engine central longitudinal axis A-A' is oriented in the z direction on the provided xyz axes. The z direction on the provided xyz axes refers to the axial direction. As used herein, the terms "radial" and "radially" refer to directions towards and away from engine central longitudinal axis A-A' and the z-axis. As used herein, the terms "circumferential" and "circumferentially" refer to directions about engine central longitudinal axis A-A' and the z-axis.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 and high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. Fan section 22, compressor section 24, and/or turbine section 28 may each include one or more stages or sets of blade assemblies configured to rotate about engine central longitudinal axis A-A' and one or more stages or sets of stationary vane assemblies axially interspersed with the blade assemblies but non-rotating about engine central longitudinal axis A-A'.

Figure 2:
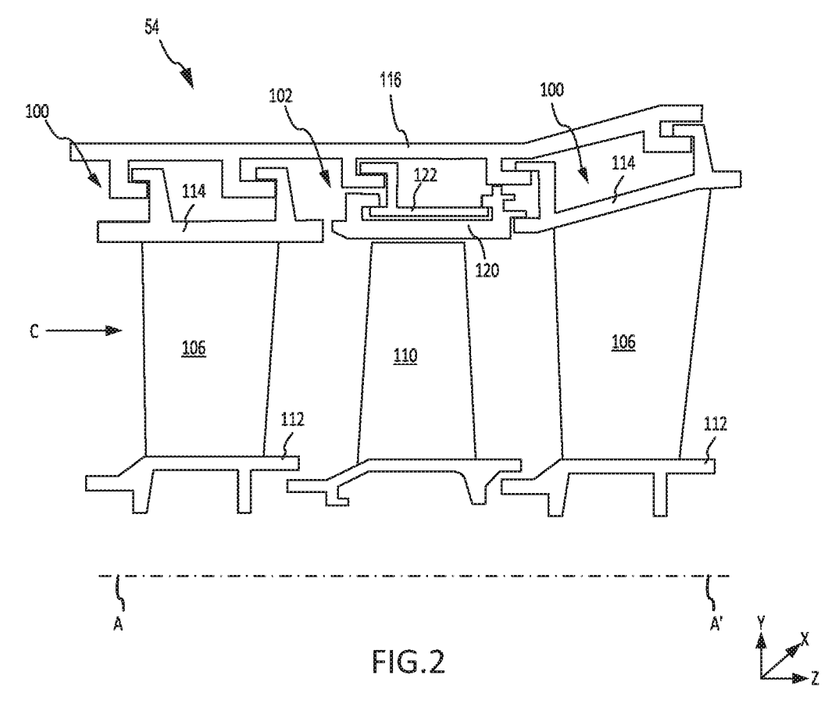
FIG. 2 illustrates a schematic cross-section of a portion of a high pressure turbine section of the gas turbine engine of FIG. 1, in accordance with various embodiments.

Referring to FIG. 2, and with continued reference to FIG. 1, a portion of high pressure turbine 54 is illustrated, in accordance with various embodiments. High pressure turbine 54 may include non-rotating vane assemblies 100 and rotating blade assemblies 102 (one shown) axially interspersed with vane assemblies 100. Vane assemblies 100 each include a plurality of vanes 106 positioned about engine central longitudinal axis A-A'. Each vane 106 may extend between an inner vane platform 112 and an outer vane platform 114. Outer vane platform 114 may be configured to couple, or otherwise support attachment of, vane assemblies 100 to a turbine case structure 116. Turbine case structure 116 may form a portion of engine static structure 36 in FIG. 1. Vane assemblies 100 comprise static structures that do not rotate relative to engine central longitudinal axis A-A'. Vane assemblies 100 may help direct the flow of fluid (i.e., airflow along core flow path C) received by and output from blade assemblies 102.

Blade assemblies 102 each include a plurality of blades 110 configured for rotation about engine central longitudinal axis A-A'. For example, blades 110 may rotate in response to receiving a flow of fluid (e.g., combustion gases) from combustor 56 in FIG. 1. Power from the flow may be converted to mechanical power, or torque, by blades 110. Blade assemblies 102 may also include a blade outer air seal 120 (BOAS 120). A blade outer air seal support 122 (BOAS support 122) may couple, or otherwise secure, BOAS 120 to turbine case structure 116.

BOAS 120 is disposed radially outward of blades 110. BOAS 120 is configured to provide a seal to reduce or prevent hot gases from leaking over the tips of blades 110. In various embodiments, BOAS 120 may be segmented. For example, BOAS 120 may comprise a plurality of arcuate BOAS segments arranged in circumferential series around engine central longitudinal axis A-A'.

Figure 3:
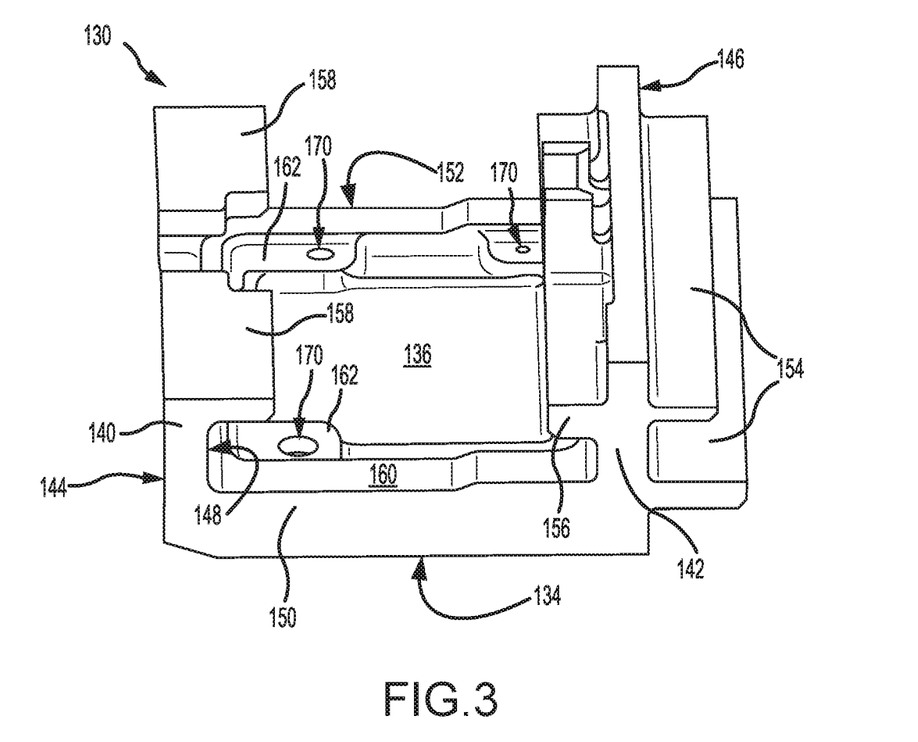
FIG. 3 illustrates a perspective view of a BOAS segment, in accordance with various embodiments.

With reference to FIG. 3, a BOAS segment 130 of BOAS 120 is illustrated, in accordance with various embodiments. BOAS segment 130. BOAS segment 130 includes a radially inward (or first) surface 134 and a radially outward (or second) surface 136. When installed in blade assemblies 102, with momentary reference to FIG. 2, radially inward surface 134 of BOAS segments 130 is oriented toward blades 110. In this regard, radially inward surface 134 is a radially inward facing surface and radially outward surface 136 is a radially outward facing surface.

Returning to FIG. 3, BOAS segment 130 includes a forward wall 140 and an aft wall 142. Forward wall 140 and aft wall 142 extend in a radially outward direction and may define a forward edge 144 and an aft edge 146, respectively, of BOAS segment 130. In various embodiments, aft wall 142 may include one or more aftward extending flange(s) 154 and one or more forward extending flange(s) 156. Forward wall 140 may include one or more aftward extending flange(s) 158. Flanges 158 may extend aftward from an aftward oriented surface 148 of forward wall 140.

BOAS segment 130 includes a first circumferential wall 150 and a second circumferential wall 152. First circumferential wall 150 and second circumferential wall 152 extend from forward wall 140 to aft wall 142. BOAS segments 130 may be arranged in circumferential series such that the first circumferential wall 150 of a first BOAS segment 130 is circumferentially adjacent to the second circumferential wall 152 of a second BOAS segment 130. In various embodiments, and with reference to FIG. 4B, a radial height, or thickness, H1 of BOAS segment 130 at first circumferential wall 150 is greater that a radial height, or thickness, H2 of BOAS segment 130 at radially outward surface 136. Radial height H1 is measured between radially inward surface 134 of BOAS segment 130 and surface 160 of first circumferential wall 150. Surface 160 of first circumferential wall 150 is oriented opposite, or generally away from, radially inward surface 134. Radial height H2 is measured between radially inward surface 134 and radially outward surface 136 of BOAS segment 130. In various embodiments, second circumferential wall 152 includes a radial height equal to radial height H1 of first circumferential wall 150.

Returning to FIG. 3, in accordance with various embodiments, BOAS segment 130 includes one or more inlet orifice(s) 170. Stated differently, BOAS segment 130 defines inlet orifices 170. In various embodiments, inlet orifices 170 are formed in raised areas of BOAS segment 130. In this regard, inlet orifices 170 may be formed through raised portions 162 of BOAS segment 130.

Figure 4A:
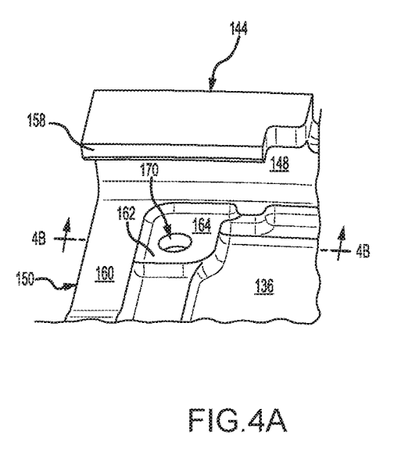
FIG. 4A illustrates a perspective view of an inlet orifice of the BOAS segment of FIG. 3, in accordance with various embodiments.
Figure 4B:
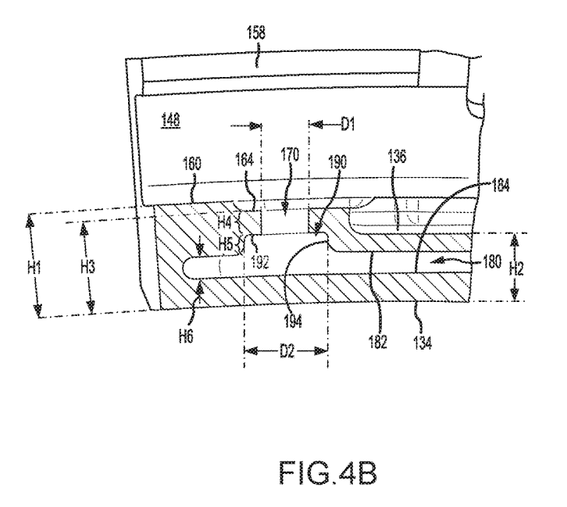
FIG. 4B illustrates a cross-section view of the inlet orifice of FIG. 4A taken along the line 4B-4B in FIG. 4A, in accordance with various embodiments.

With combined reference to FIGS. 4A and 4B, additional details of an inlet orifice formed through a raised portion 162 of BOAS segment 130 are illustrated, in accordance with various embodiments. A radial height, or thickness, H3 of BOAS segment 130 at raised portion 162 is greater that the radial height H2 of BOAS segment 130 at radially outward surface 136. Radial height H3 is measured between radially inward surface 134 of BOAS segment 130 and surface 164 of raised portion 162. Surface 164 of raised portion 162 is oriented opposite, or generally away from, radially inward surface 134. In this regard, surface 164 is a radially outward facing surface. In various embodiments, the radial height H3 of BOAS segment 130 at raised portion 162 is less than radial height H1 of BOAS segment 130 at first circumferential wall 150.

In accordance with various embodiments, BOAS segment 130 defines one or more internal cooling channel(s) 180. Cooling channels 180 may form a cooling circuit through BOAS segment 130. Inlet orifices 170 are fluidly coupled to cooling channels 180. Cooling airflow in the space over (i.e., radially outward from) radially outward surface 136 may be provided to cooling channels 180 through inlet orifices 170. Stated differently, cooling airflow may flow through inlet orifice 170 and in to cooling channel 180.

Cooling channel 180 may be defined, at least partially, by a distal channel surface 182 and a proximal channel surface 184. Distal channel surface 182 may be oriented toward proximal channel surface 184 and engine central longitudinal axis A-A' (FIG. 2).

A stress-relief orifice 190 may be formed between cooling channel 180 and inlet orifice 170. Stress-relief orifice 190 is defined by an orifice surface 192 and orifice wall 194.

Orifice wall 194 extends from distal channel surface 182 to orifice surface 192. Orifice surface 192 is radially outward of distal channel surface 182. Inlet orifice 170 extends from surface 164 of raised portions 162 to orifice surface 192. In various embodiments, inlet orifice 170 has a radial height, or thickness, H4 of at least 0.015 inches (0.038 cm). Radial height H4 is measured between surface 164 and orifice surface 192. In various embodiments, radial height H4 may be between 0.020 inches and 0.030 inches (0.051 cm and 0.076 cm).

Stress-relief orifice 190 extends from orifice surface 192 to distal channel surface 182. Stress-relief orifice 190 has a radial height, or thickness, H5. In various embodiments, radial height H5 is between 10% and 200% of the radial height, or thickness, H6 of cooling channel 180. Radial height H6 is measured between distal channel surface 182 and proximal channel surface 184. In various embodiments, radial height H5 is between 50% and 100% of radial height H6.

In various embodiments, stress-relief orifice 190 may be cylindrically shaped. In this regard, a cross-section of stress-relief orifice 190 taken along a plane generally parallel to surface 164 may be circular. Inlet orifice 170 may be cylindrically shaped. In this regard, a cross-section of inlet orifice 170 taken along a plane generally parallel to surface 164 may be circular. In various embodiments, a cross-section of stress-relief orifice 190 and/or a cross-section inlet orifice 170 taken along a plane generally parallel to surface 164 may comprise an elliptical, an oval, a rectangular, a polygonal, or any other desired shape Stress-relief orifice 190 may be concentric to inlet orifice 170 such that the radii of stress-relief orifice 190 and inlet orifice 170 are measured from the same axis. A diameter D1 of inlet orifice 170 is less than a diameter D2 of stress-relief orifice. In various embodiments, diameter D2 is at least 10% greater than diameter D1. In various embodiments, diameter D1 may be between 0.060 inches and 0.100 inches (0.152 centimeters (cm) and 0.254 cm) and diameter D2 may be between 0.140 inches and 0.180 inches (0.356 cm and 0.457 cm). In various embodiments, diameter D1 may be approximately 0.079 inches (0.0.201 cm) and diameter D2 may be approximately 0.159 inches (0.404 cm). As used in the previous context, "approximately" means±0.005 inches (±0.013 cm). In various embodiments, diameter D1 may be between 0.025 inches and 0.050 inches (0.064 cm and 0.127 cm) and diameter D2 may be between 0.080 inches and 0.115 inches (0.203 cm and 0.292 cm). In various embodiments, diameter D1 may be approximately 0.036 inches (0.0.091 cm) and diameter D2 may be approximately 0.098 inches (0.249 cm). As used in the previous context, "approximately" means±0.005 inches (±0.013 cm).

Stress-relief orifice 190 tends to shield inlet orifice 170 from the tensile stress field created by the thermal gradient between radially inward surface 134 and radially outward surface 136. Stress-relief orifice 190 may be subjected to the tensile stress field, but experiences a lower stress than inlet orifice 170 and/or lower than inlet orifices extending to the distal channel surface (i.e., cooling circuits which do not include stress-relieve orifices). BOAS segment 130 tends to exhibit improved fatigue capability, which may allow BOAS 120 to be employed in greater temperatures and/or exposed to increased temperatures for a longer durations of time.

Figure 5:
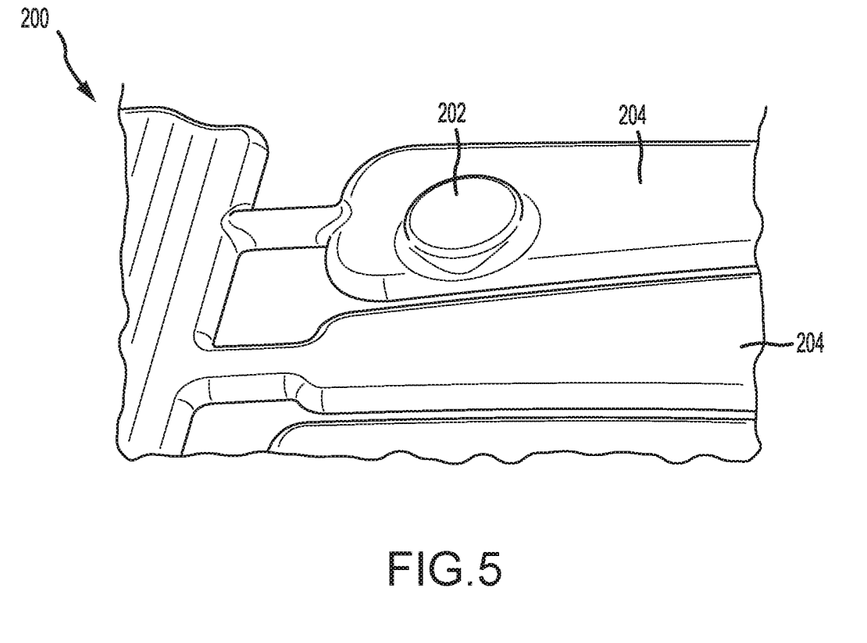
FIG. 5 illustrates a perspective view of core configured to form a BOAS cooling channels and having a boss corresponding to an inlet orifice location, in accordance with various embodiments.

With reference to FIG. 5, a core 200 configured to form cooling channels 180 and stress-relief orifice 190 is illustrated, in accordance with various embodiments. Core 200 may comprise metal, composite, or any other suitable material. In various embodiments, core 200 may be a ceramic core. Core 200 includes one or more boss(es) 202. The location of bosses 202 corresponds to the location of inlet orifices 170, with momentary reference to FIG. 3. In various embodiments, the location of bosses 202 corresponds to raised portions 162 of BOAS segment 130, with momentary reference to FIG. 3. Bosses 202 are formed on channel portions 204 of core 200. A thickness of core 200 at boss 202 is greater than a thickness of core 200 at channel portion 204. The thickness of core 200 at boss 202 is equal to the sum of radial height H5 and radial height H6 in FIG. 4B. The thickness of core 200 at channel portion 204 is equal to radial height H6.

Figure 6:
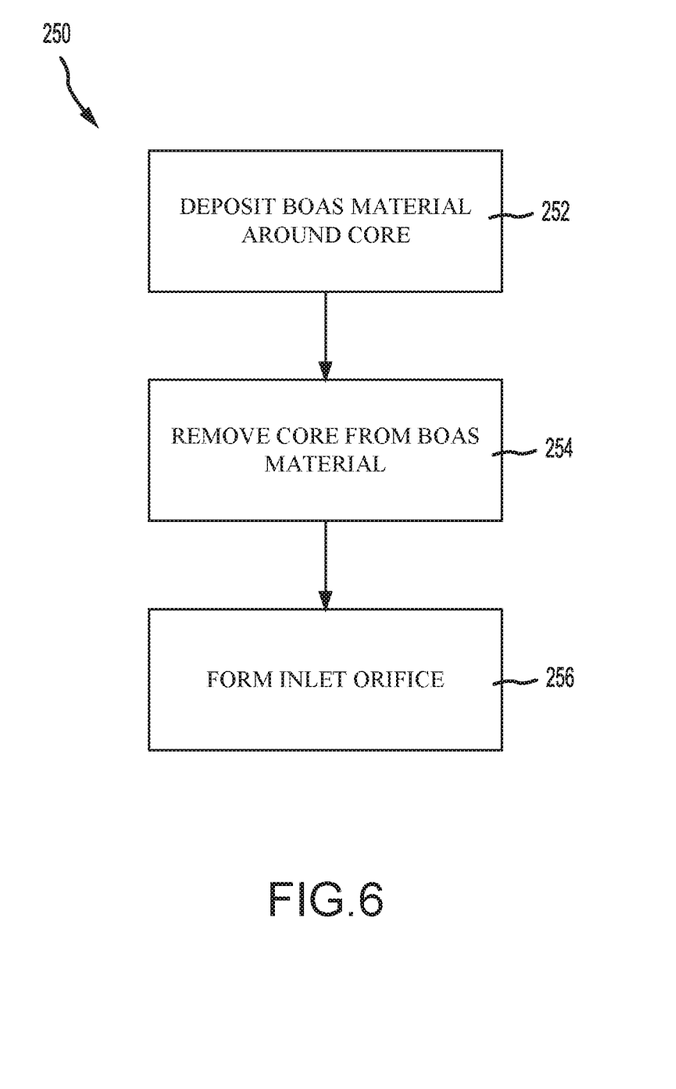
FIG. 6 illustrates a method of making a BOAS segment having a fatigue resistant inlet orifice, in accordance with various embodiments.

FIG. 6 illustrates a method 250 of forming a BOAS segment having fatigue resistant inlet orifices, in accordance with various embodiments. Method 250 may include the steps of depositing a BOAS material around a core (step 252). The core being configured to form a cooling channel in the BOAS and including a boss. A thickness of the core as measured at the boss being greater than a cooling channel portion of the core. Method 250 may further comprise removing the core (step 254). For example, the core may be leached out of the BOAS material. Method 250 further comprises forming an inlet orifice through the BOAS material (step 256). A location of the inlet orifice corresponding to a location of the boss.

In various embodiments, step 256 may include forming the inlet orifice using electrical discharge machining (EDM). Using EDM to form inlet orifices tends to be associated with greater reductions in fatigue capability, as compared to milling or drilling the inlet orifices. With reference to FIG. 4B, the increased distance between inlet orifices 170 and proximal channel surface 184 (i.e., between orifice surface 192 and proximal channel surface 184) may eliminate or decrease the reductions in fatigue capability associated with EDM. In this regard, inlet orifices 170 formed using EDM may have fatigue capability similar to that of inlet orifices formed using milling or drilling. In various embodiments, step 256 may include forming the inlet orifice using milling, drilling, or any other suitable technique.

While inlet orifices 170 and method 250 are described in relation to a BOAS segment, it is further contemplated and understood that the features and techniques described herein may be applied to other parts having cooling circuits. For example, cooling channels 180, stress-relief orifices 190, and inlet orifices 170 may be formed in inner vane platform 112 and/or outer vane platform 114 in FIG. 2.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A blade outer air seal segment, comprising:
   a first radially outward facing surface;
   a radially inward facing surface oriented away from the first radially outward facing surface;
   a forward wall located at a forward end of the blade outer air seal segment and extending radially outward from the first radially outward facing surface;
   a cooling channel located between the first radially outward facing surface and the radially inward facing surface;
   an inlet orifice defined by the first radially outward facing surface, the inlet orifice being fluidly coupled to the cooling channel; wherein the inlet orifice is formed through a raised portion of the blade outer air seal segment, the raised portion including the first radially outward facing surface; and
   a stress-relief orifice formed between the inlet orifice and the cooling channel, wherein the stress-relief orifice is radially aligned with the inlet orifice.

2. The blade outer air seal segment of claim 1, wherein the cooling channel is defined, at least partially, by a distal channel surface and a proximal channel surface, and wherein the distal channel surface faces away from the first radially outward facing surface of the blade outer air seal segment, and wherein the proximal channel surface faces toward the distal channel surface and away from the radially inward facing surface of the blade outer air seal segment, and wherein the distal channel surface is located radially between the proximal channel surface and the first radially outward facing surface of the blade outer air seal segment, and wherein the stress-relief orifice is defined by an orifice wall and an orifice surface, the orifice surface facing radially inward and the orifice wall extending from the distal channel surface to the orifice surface.

3. The blade outer air seal segment of claim 2, wherein a first radial height of the raised portion of the blade outer air seal segment is greater than a second radial height of the blade outer air seal segment, wherein the first radial height is measured between the first radially outward facing surface and the radially inward facing surface of the blade outer air seal segment, and wherein the second radial height is measured between a second radially outward facing surface and the radially inward facing surface of the blade outer air seal segment.

4. The blade outer air seal segment of claim 3, wherein a radial height of the stress-relief orifice is between 10% and 200% of a radial height of the cooling channel, the radial height of the stress-relief orifice being measured between the orifice surface and the distal channel surface, the radial height of the cooling channel being measured between the proximal channel surface and the distal channel surface.

5. The blade outer air seal segment claim 1, wherein the stress-relief orifice is concentric to the inlet orifice.

6. The blade outer air seal segment of claim 1, wherein a diameter of the stress-relief orifice is at least 10% greater than a diameter of the inlet orifice.

7. A turbine section of a gas turbine engine, the turbine section comprising:
   a blade configured to rotate about an axis; and
   a blade outer air seal segment radially outward of the blade, the blade outer air seal segment comprising:
      a radially inward facing surface oriented toward the blade;
      a first radially outward facing surface oriented away from the radially inward facing surface;
      a forward wall located at a forward end of the of the blade outer air seal segment and extending radially outward from the first radially outward facing surface;
      an internal cooling channel located between the radially inward facing surface and the first radially outward facing surface;
      an inlet orifice defined by the first radially outward facing surface, the inlet orifice being fluidly coupled to the internal cooling channel wherein the inlet orifice is formed through a raised portion of the blade outer air seal segment, the raised portion of the blade outer air seal segment comprising the first radially outward facing surface; and
      a stress-relief orifice formed between the inlet orifice and the internal cooling channel, wherein the stress-relief orifice is radially aligned with the inlet orifice.

8. The turbine section of claim 7, wherein the internal cooling channel is defined, at least partially, by a distal channel surface and a proximal channel surface, and wherein the distal channel surface faces away from the first radially outward facing surface of the blade outer air seal segment, and wherein the proximal channel surface faces toward the distal channel surface and away from the radially inward facing surface of the blade outer air seal segment, and wherein the distal channel surface is located radially between the first radially outward facing surface and the proximal channel surface, and wherein the stress-relief orifice is defined by an orifice wall and an orifice surface, the orifice surface facing radially inward and the orifice wall extending from the distal channel surface to the orifice surface.

9. The turbine section of claim 8, wherein a radial height of the stress-relief orifice is between 10% and 200% of a radial height of the internal cooling channel the radial height of the stress-relief orifice being measured between the orifice surface and the distal channel surface, the radial height of the internal cooling channel being measured between the proximal channel surface and the distal channel surface.

10. The turbine section of claim 7, wherein a first radial height of the raised portion of the blade outer air seal segment is greater than a second radial height of the blade outer air seal segment, wherein the first radial height is measured between the first radially outward facing surface and the radially inward facing surface of the blade outer air seal segment, and wherein the second radial height is measured between a second radially outward facing surface of the blade outer air seal segment and the radially inward facing surface of the blade outer air seal segment.

11. The turbine section of claim 10, wherein the blade outer air seal segment comprises a circumferential wall, and wherein a radial height of the circumferential wall is greater than the first radial height of the raised portion of the blade outer air seal segment, the radial height of the circumferential wall being measured between the radially inward facing surface of the blade outer air seal segment and a third radially outward facing surface of the circumferential wall.

12. The turbine section of claim 7, wherein a diameter of the stress-relief orifice is at least 10% greater than a diameter of the inlet orifice.

13. The turbine section of claim 12, wherein the stress-relief orifice is concentric to the inlet orifice.

* * * * *